United States Patent
Kishibe

(10) Patent No.: US 7,512,195 B2
(45) Date of Patent: Mar. 31, 2009

(54) FREQUENCY CONTROL APPARATUS, WIRELESS COMMUNICATION APPARATUS AND FREQUENCY CONTROL METHOD

(75) Inventor: Shinnichi Kishibe, Izumiotu (JP)

(73) Assignee: Icom Incorporated (JP)

(*) Notice: Subject to any disclaimer, the term of this patent is extended or adjusted under 35 U.S.C. 154(b) by 620 days.

(21) Appl. No.: 11/241,463

(22) Filed: Sep. 30, 2005

(65) Prior Publication Data
US 2006/0067439 A1 Mar. 30, 2006

(30) Foreign Application Priority Data
Sep. 30, 2004 (JP) .............................. 2004-289346

(51) Int. Cl.
  *H04L 27/22* (2006.01)
  *H03D 3/22* (2006.01)
(52) U.S. Cl. ...................................... 375/344; 375/329
(58) Field of Classification Search ................. 375/326, 375/329, 332, 344, 354, 371, 362; 455/182.1, 455/182.2, 192.1, 192.2
See application file for complete search history.

(56) References Cited

U.S. PATENT DOCUMENTS 6,396,884 B1* 5/2002 Maruyama .................. 375/344
6,631,174 B1* 10/2003 Asahara et al. .............. 375/344

FOREIGN PATENT DOCUMENTS

JP 06-261089 9/1994
JP 2000-151734 5/2000

* cited by examiner

Primary Examiner—Betsy L Deppe
(74) Attorney, Agent, or Firm—Baker & McKenzie LLP

(57) ABSTRACT

A wireless communication apparatus performs fast control even on a large phase rotation of a received signal to synchronize the frequency of a received signal with a specified frequency. A symbol-phase-difference detector detects an intersymbol phase difference of an input signal demodulated by a quadrature demodulator. When a minute-phase-error detector detects an intersymbol minute phase error between symbols whose phase difference has been detected by the symbol-phase-error detector, an oversampling/phase-rotational-amount detecting section detects an intersymbol phase rotational amount of the received signal by oversampling the received signal at a rate higher than a symbol rate. A coarse-phase-error detector detects a coarse phase error between symbols whose phase difference has been detected by the oversampling/phase-rotational-amount detecting section. A frequency control amount calculator computes a frequency control amount for the process station to control the frequency of the input signal.

12 Claims, 3 Drawing Sheets

FREQUENCY CONTROL APPARATUS, WIRELESS COMMUNICATION APPARATUS AND FREQUENCY CONTROL METHOD

This application is based on Japanese Patent Application No. 2004-289346 filed on Sep. 30, 2004 and including specification, claims, drawings and summary. The disclosure of the above Japanese Patent Application is incorporated herein by reference in its entirety.

BACKGROUND OF THE INVENTION

1. Field of the Invention

The present invention relates to a frequency control apparatus, a wireless communication apparatus, and a frequency control method.

2. Description of the Related Art

Carrier drift in a communication system significantly degrades the transmission quality. The carrier drift causes deformation of transmission signals and degradation of the frequency characteristic and the error rate in the transmission characteristic in a pass band.

There is a technology which detects phase data of symbols in a received signal and performs frequency control based on the detection of the phase rotation between symbols in order to prevent such degradation. With regard to the technology which performs frequency control based on the detection of the symbol phase, there are techniques of detecting the rotation of the phase by oversampling symbols at a rate higher than a symbol rate (see, for example, Unexamined Japanese Patent Application KOKAI Publication No. H6-261089 and Japanese Patent No. 3353724).

The system disclosed in Unexamined Japanese Patent Application KOKAI Publication No. H6-261089 has a problem that it cannot cope with a large frequency error. As the system disclosed in Japanese Patent No. 3353724 uses the fact that if an intersymbol phase difference is a specified phase difference (either ±45° or ±135° for π/4 shift QPSK (Quadrature Phase Shift Keying)), the average converges to ±0°, the system takes time in detecting a frequency error, making fast control difficult, and has a difficulty in accurately detecting a phase error if there is an offset in the direction of phase deviation.

SUMMARY OF THE INVENTION

Accordingly, it is an object of the present invention to provide a frequency control apparatus and a frequency control method which can accomplish fast frequency control even when there is a large frequency error.

To achieve the object, according to the first aspect of the invention, there is provided a frequency control apparatus which synchronizes a frequency of a received signal, and comprises:

an oversampling/phase-rotational-amount detecting section which detects an intersymbol phase rotational amount between symbols of the received signal, modulated by a prescribed modulation method, by oversampling the received signal at a rate higher than a symbol rate;

a coarse-phase-error detector which detects an amount exceeding a maximum phase deviation in a specified intersymbol phase deviation based on the prescribed modulation method as a coarse phase error when the intersymbol phase rotational amount detected by the oversampling/phase-rotational-amount detecting section exceeds a predetermined amount equal to or greater than the maximum phase deviation;

a frequency control amount acquisition section which acquires a frequency control amount based on the coarse phase error; and a frequency controller which controls the frequency of the received signal according to the frequency control amount.

According to the frequency control apparatus of the invention, a coarse phase error is acquired as a frequency control amount for controlling a large phase rotation exceeding a predetermined amount equal to or greater than the maximum phase deviation in the given intersymbol phase deviation. As the control process based on the coarse phase error does not take a considerable time, fast frequency control is possible even upon occurrence of a large phase rotation exceeding a predetermined amount equal to or greater than the maximum phase deviation.

The frequency control apparatus may further comprise:

a phase difference detector which detects an intersymbol phase difference between symbols in the received signal modulated by the prescribed modulation method; and a minute-phase-error detector which detects, as a minute phase error, a difference between the phase difference detected by the phase difference detector and the specified intersymbol phase deviation based on the prescribed modulation method, whereby the frequency control amount acquisition section acquires the frequency control amount based on the coarse phase error and the minute phase error.

According to the invention, the minute phase error occurred between symbols can be controlled based on the detection of a phase error by the minute-phase-error detector.

In the frequency control apparatus provided with the minute-phase-error detector, the predetermined amount exceeding the maximum phase deviation in the specified intersymbol phase deviation based on the prescribed modulation method can be a detection limit of the minute phase error by the minute-phase-error detector added to the maximum phase deviation in the specified intersymbol phase deviation based on the prescribed modulation method.

According to the invention, when the phase rotation between symbols is equal to or smaller than the predetermined amount, frequency control can be carried out with the detection of a phase error by the minute-phase-error detector. When there is a phase rotation exceeding the predetermined amount, frequency control can be carried out by using the coarse phase error as the frequency control amount.

An average of a plurality of minute phase errors detected by the minute-phase-error detector may be input to the frequency control amount acquisition section, so that the frequency control amount acquisition section acquires the frequency control amount based on the coarse phase error and the average.

According to the invention, it is possible to acquire an average of a plurality of minute phase errors and acquire the frequency control amount based on the minute phase error as an average. With regard to the detection of a minute phase error, therefore, the frequency control apparatus can reduce the influence of noise and thus improve the precision of the frequency control amount. Thereby, a minute phase is controllable with sufficient accuracy.

The prescribed modulation method may be π/4 shift QPSK, the specified intersymbol phase deviation based on the modulation method may be (±45°, ±135°), and the maximum phase deviation in the specified intersymbol phase deviation may be ±135°.

According to the invention, it is possible to control the frequency of a signal to be input to the frequency control apparatus when the input signal is modulated by π/4 shift QPSK, thus ensuring fast frequency control even when a large phase rotation occurs.

A wireless communication apparatus according to the second aspect of the invention comprises:

an antenna for receiving a radio signal;

a tuner for selecting a frequency band of a radio signal to be received;

a local oscillator which outputs a signal of a frequency whose intermediate frequency signal is a received signal received by the antenna and the tuner;

a demodulator which demodulates the intermediate frequency signal; and the aforementioned frequency control apparatus, whereby the frequency of the received signal output from the demodulator is so controlled as to be synchronized with a specified frequency.

Even when a received signal has a large phase error, the wireless communication apparatus of the invention can control the phase of the received signal fast to synchronize the frequency of the received signal with the specified frequency. This can ensure signal processing without causing deformation or the like of the signal received by the wireless communication apparatus.

A frequency control method according to the third aspect of the invention synchronizes a frequency of a received signal, and comprises:

an oversampling/phase-rotational-amount detecting step of detecting an intersymbol phase rotational amount between symbols of the received signal, modulated by a prescribed modulation method, by oversampling the received signal at a rate higher than a symbol rate;

a coarse-phase-error detecting step of detecting an amount exceeding a maximum phase deviation in a specified intersymbol phase deviation based on the prescribed modulation method as a coarse phase error when the intersymbol phase rotational amount detected by the oversampling/phase-rotational-amount detecting step exceeds a predetermined amount equal to or greater than the maximum phase deviation;

a frequency control amount acquisition step of acquiring a frequency control amount based on the coarse phase error; and a frequency control step of controlling the frequency of the received signal according to the frequency control amount.

According to the frequency control method of the invention, a coarse phase error is acquired as a frequency control amount for controlling a large phase rotation exceeding a predetermined amount equal to or greater than the maximum phase deviation in the given intersymbol phase deviation. As the control process based on the coarse phase error does not take a considerable time, fast frequency control is possible even upon occurrence of a large phase rotation exceeding a predetermined amount equal to or greater than the maximum phase deviation.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
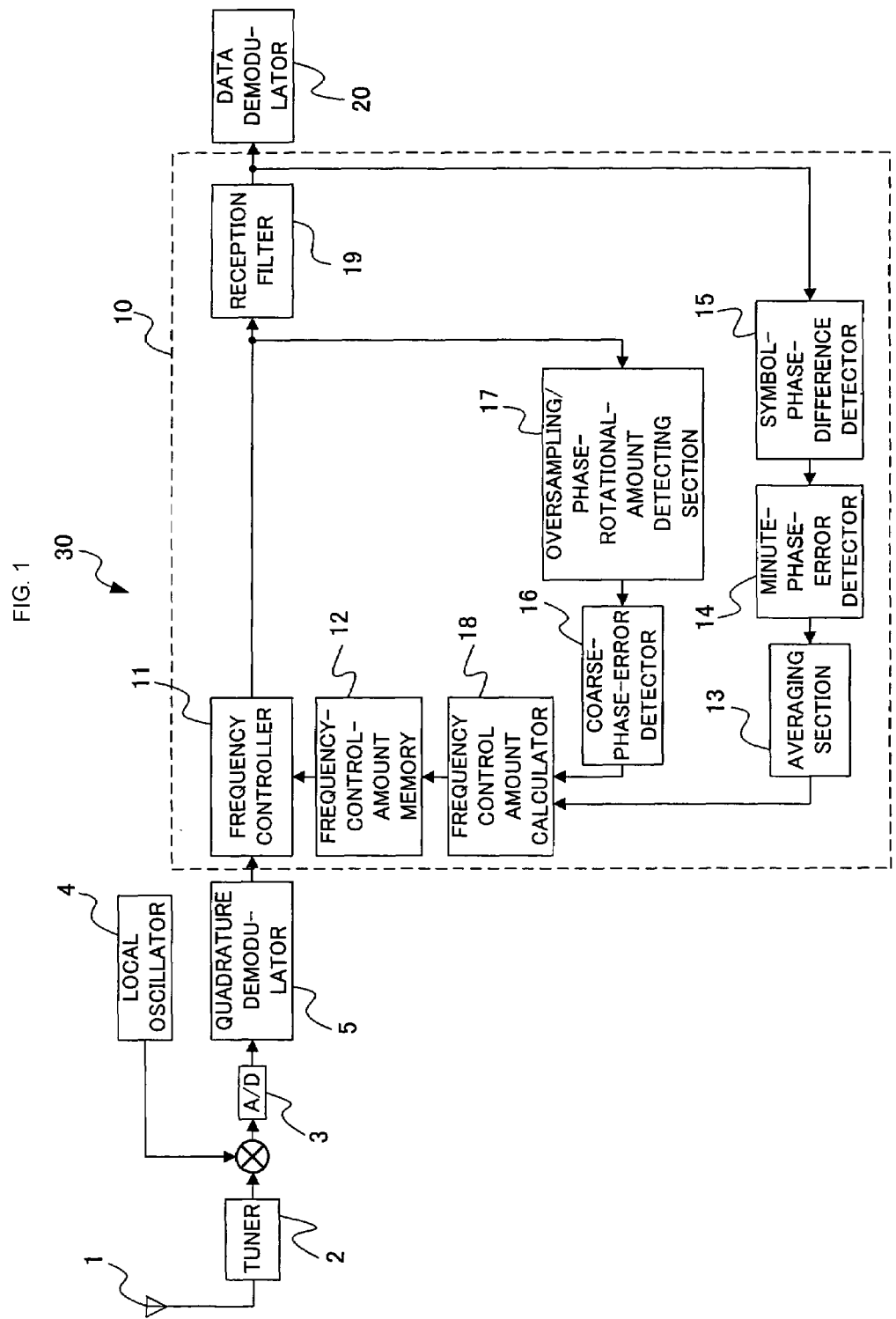
FIG. 1 is a block diagram of a wireless communication apparatus according to one embodiment of the present invention.
Figure 2:
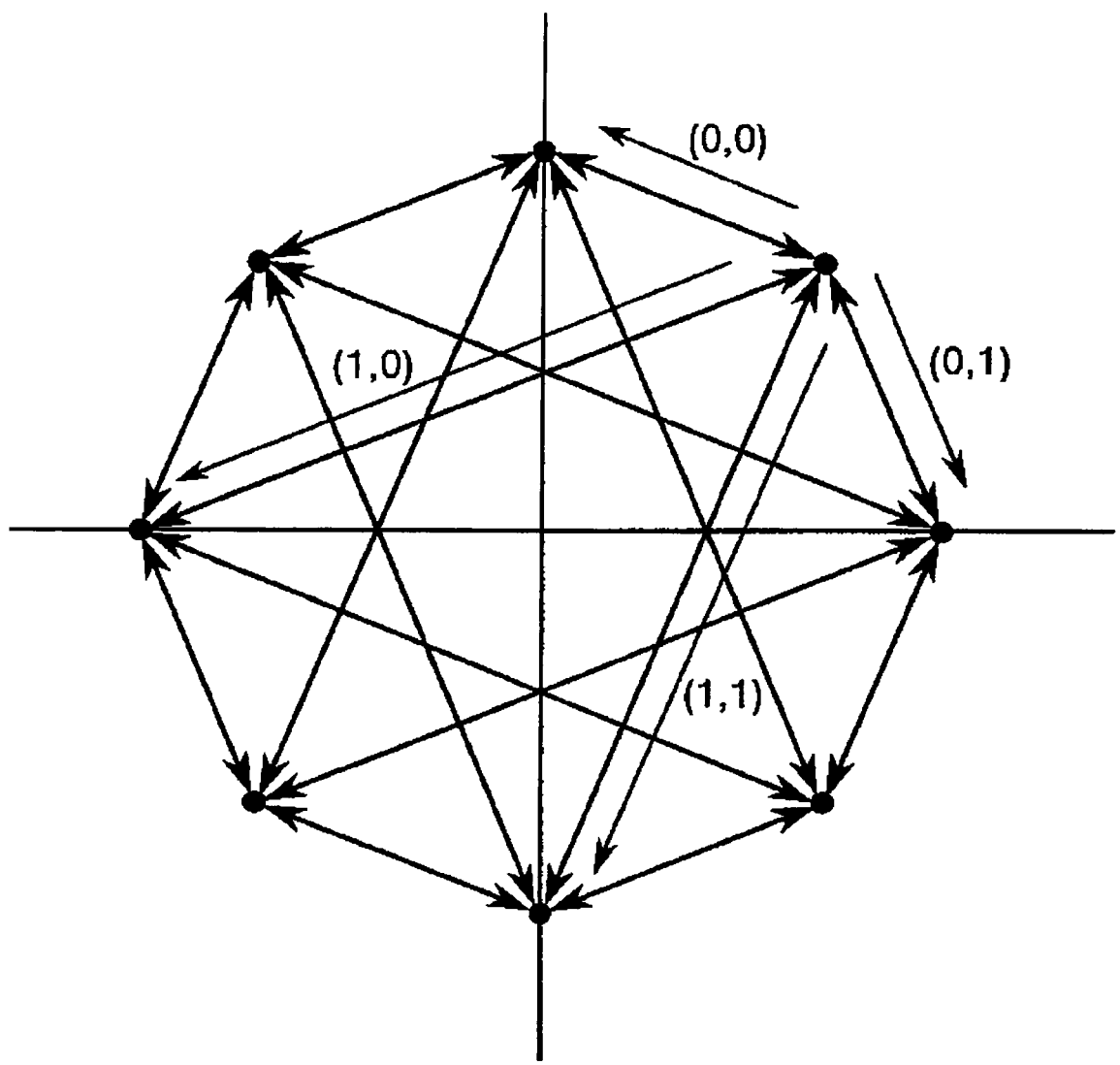
FIG. 2 is a diagram illustrating the constellation of π/4 shift QPSK.

A preferred embodiment of the present invention will be described below with reference to FIGS. 1 and 2. FIG. 1 is a block diagram of a wireless communication apparatus 30 according to one embodiment of the invention. The block that removes an antenna 1, a tuner 2 and a data demodulator 20 from the wireless communication apparatus 30 constitutes a frequency control apparatus which is one embodiment of the invention. A frequency control method according to one embodiment of the invention can be carried out by the wireless communication apparatus 30 to be discussed below.

The wireless communication apparatus 30 comprises the antenna 1, the tuner 2, an A/D converter 3, a local oscillator 4, a quadrature demodulator 5, a frequency synchronization controller 10, and the data demodulator 20. The wireless communication apparatus 30 is provided with an unillustrated operation section. The operation section is provided with various operation keys. When the user of the wireless communication apparatus 30 operates any operation key, the wireless communication apparatus 30 performs an operation according to the type and the content of the operation key.

The antenna 1 receives a radio signal. The tuner 2 selectively receives signals of a specific communication channel, and selects the frequency band of a radio signal to be received. The tuner 2 is set with the frequency of a channel selected by the operation of a channel selection key by a user.

The tuner 2 adjusts the reception characteristic in such a way that the reception frequency matches with the set frequency. The received signal of the channel with the frequency set in the tuner 2 is input to the tuner 2 from the antenna 1. The received signal input to the tuner 2 is converted into an intermediate frequency signal by an oscillation signal of the local oscillator 4.

The received signal converted into the intermediate frequency signal is input to the A/D converter 3. The A/D converter 3 converts the analog signal to a digital signal. The intermediate frequency signal converted to the digital signal by the A/D converter 3 is input to the quadrature demodulator 5 from the A/D converter 3.

The quadrature demodulator 5 performs quadrature demodulation of the digital intermediate frequency signal to yield an in-phase component (I) and a quadrature componet (Q). The quadrature demodulator 5 performs a process of demodulating the received signal, modulated based on π/4 shift QPSK (Quadrature Phase Shift Keying), based on this modulation method.

π/4 shift QPSK will be discussed below referring to FIG. 2. FIG. 2 is a diagram illustrating the constellation of π/4 shift QPSK, which is designed in such a way that the locus of phase changes does not pass the origin.

When the locus of phase changes passes the origin, the amplitude of a carrier wave drastically changes to 0 from the maximum value, thus requiring high linearity in a power amplification circuit or the like. This reduces the efficiency. Because the locus of phase changes does not pass the origin according to π/4 shift QPSK as mentioned above, such reduction in efficiency can be prevented.

The frequency synchronization controller 10 detects a phase error of an input signal based on phase data of symbols, and controls the frequency of the input signal. Accordingly, the phase of the input signal is synchronized with the phase of a specified frequency based on the modulation method for the received signal.

The frequency synchronization controller 10 includes a frequency controller 11, a frequency-control-amount memory 12, an averaging section 13, a minute-phase-error detector 14, a symbol-phase-difference detector 15, a coarse-phase-error detector 16, an oversampling/phase-rotational-amount detecting section 17, a frequency control amount calculator 18, and a reception filter 19.

The frequency controller 11 controls the frequency of the input signal, input from the quadrature demodulator 5, based on a frequency control amount input from the frequency-control-amount memory 12.

The input signal output from the frequency controller 11 is input to the reception filter 19, which is a so-called a root Nyquist filter. The signal that has passed the reception filter 19 is input to the data demodulator 20.

The data demodulator 20 performs a process of demodulating the signal input from the reception filter 19. When the wireless communication apparatus 30 is a cell phone or the like which copes with voices and the baseband signal is an audio signal, for example, the signal input to the data demodulator 20 is demodulated to a signal of an audio frequency (AF signal).

When the demodulated signal is an AF signal, for example, the AF signal is converted to an analog AF signal to be input to a speaker. The speaker outputs sounds based on the input signal.

Data of symbols of the input signal output from the frequency controller 11 is input to the oversampling/phase-rotational-amount detecting section 17. The oversampling/phase-rotational-amount detecting section 17 detects a phase difference (phase rotation amount) between symbols by sampling the input signal at a sampling rate higher than a symbol rate (oversampling), e.g., several integer multiple of the symbol rate, (i.e., by adding the phase rotation amount between samples).

As the phase rotation amount between symbols is detected through oversampling, it is possible to grasp the rotational direction of the phase, detects a symbol which whose phase rotates over a farthest signal point in one symbol to or beyond the neighborhood of a next symbol, and detect the over-rotated phase amount. Data on the phase rotation amount between symbols detected by the oversampling/phase-rotational-amount detecting section 17 is input to the coarse-phase-error detector 16.

Based on the data on the intersymbol phase rotation amount input from the oversampling/phase-rotational-amount detecting section 17, the coarse-phase-error detector 16 detects a coarse phase error as follows.

The coarse-phase-error detector 16 detects if the intersymbol phase rotation amount is greater than the maximum range taking an error in the specified phase deviation into consideration.

The specified phase deviation between two symbols is (±45°, ±135°) when the modulation method π/4 shift QPSK is adopted. The range taking an error in the specified phase deviation into consideration is the range (−180° to +180°) in which the range where the minute-phase-error detector 14 can detect a minute phase error is taken into consideration.

When the phase rotation amount exceeds the range −180° to +180°) in which an error in the specified phase deviation is taken into consideration, the coarse-phase-error detector 16 detects that amount as a coarse phase rotation amount.

That is, when the phase rotation amount exceeds the maximum phase rotation amount (−180° to +180°) which can be controlled based on the detection of a minute phase error by the minute-phase-error detector 14, the coarse-phase-error detector 16 detects that amount as a coarse phase rotation amount. The maximum phase rotation amount (−180° to +180°) that is controllable based on the detection of a minute phase error becomes a reference for acquiring a coarse phase error and is equivalent to a predetermined amount which is equal to or greater than the maximum phase deviation in the specified phase deviation.

The maximum phase rotation amount (−180° to +180°) controllable based on the detection of a minute phase error is acquired by adding a detection limit (−45°, +45°) of the minute phase error detected by the minute-phase-error detector 14 to the maximum phase deviation (−135°, +135°) in the specified intersymbol phase deviation. As the minute-phase-error detector 14 detects a phase error between closest symbols even when the intersymbol phase difference exceeds 45°, the detection limit of the minute phase error becomes (−45°, +45°).

Upon detection of the coarse phase rotation amount, the coarse-phase-error detector 16 acquires a coarse phase error from the coarse phase rotation amount. The coarse phase error is acquired as a part in the coarse phase rotation amount which exceeds the maximum phase deviation (−135°, +135°) in the specified phase deviation (±45°, ±135°). When the coarse phase rotation amount is ±225°, for example, the coarse phase error becomes +90°. When the coarse phase rotation amount is −225°, the coarse phase error becomes −90°.

The use of the coarse phase error as a frequency control amount can control the intersymbol phase difference to the specified phase deviation that should have been taken. When the coarse phase rotation amount detected is +200°, for example, a part in the specified phase deviation of 65° which exceeds the maximum phase deviation of +135° is detected as a coarse phase error.

Even if the coarse phase rotation amount is detected, the phase rotation amount that has exceeded the normal specified phase deviation cannot be detected accurately. That is, when phase rotation originated from the coarse phase rotation amount occurs, it is not possible to know by which phase deviation in the normal specified phase deviation the phase rotation has occurred, so that the phase rotation with respect to the specified phase deviation that should have been taken cannot be detected accurately.

When the coarse phase rotation amount detected is +200°, for example, the specified intersymbol phase deviation that should have been taken may be +45° in addition to +135°. When the normal specified intersymbol phase deviation is +45°, the phase rotation which has occurred over the specified phase deviation is +155°.

Even in a case where the normal specified intersymbol phase deviation is +45° and the phase rotation which has occurred over the specified phase deviation is +155°, it is apparent that the phase rotation of 65°, obtained with the maximum phase deviation of 135° in the specified phase deviation taken as a reference, or greater has occurred.

As a part in the coarse phase rotation amount which exceeds 135° is treated as a coarse phase error with the maximum phase deviation of 135° in the specified phase deviation taken as a reference, and the coarse phase error is taken as a frequency control amount, therefore, the phase deviation can be controlled sequentially toward the normal specified phase deviation.

In the foregoing description, a coarse phase error is acquired by a part in the coarse phase rotation amount which exceeds the maximum phase deviation. The coarse phase error may be an expanded angle acquired by an angle which is an integer multiple of 90°, instead of the difference between the coarse phase rotation amount and the maximum phase deviation itself. It is discriminated which one of values (±225°, ±315°, . . .) when the specified phase difference (±45°, ±135°) is expanded in the rotational direction by angles (90°×n) obtained by an integer multiple of a unit angle of 90° between individual phase deviations in the specified phase deviation, the coarse phase rotation amount is closest (the coarse phase rotation amount lies within a range of ±45° from that value).

In the normal specified phase deviation (±45°, ±135°), individual phase deviations (−135°, −45°, +45°, +135°) are laid out at equal angular intervals of 90°, which is the unit angle between individual phase deviations.

Of the phase deviations obtained by expanding the maximum phase deviation (−135°, +135°) in the specified phase deviation by angles of an integer multiple of 90° in the rotational direction of the individual phases, the one closest to the intersymbol phase rotation amount is called "expanded phase deviation". The expanded angle is the angle that is an integer multiple of 90° added to the maximum phase deviation (−135°, +135°) in the specified phase deviation to acquire the expanded phase deviation.

When the expanded phase deviation closest to the intersymbol phase rotation amount is +225° (±45°), for example, the expanded angle becomes 90°. The frequency control amount for the expanded angle is −90°.

When the expanded phase deviation closest to the intersymbol phase rotation amount is +315° (±45°), the expanded angle becomes 180°. In this case, the frequency control amount for the expanded angle is −180°.

When the intersymbol phase rotation is reversed and the expanded phase deviation closest to the intersymbol phase rotation amount is −225° (35 45°), the expanded angle becomes −90°. The frequency control amount for the expanded angle is +90°.

It is apparent that the coarse-phase-error detector 16 can acquire the expanded angle as a frequency control amount based on the coarse phase rotation amount, and can acquire an angle obtained by multiplying ±90° by an integer, as the expanded angle.

In controlling the phase rotation of a symbol using the frequency control amount based on the above-described coarse phase rotation amount, an immediately preceding symbol is not subjected to frequency control, thus requiring that the frequency control amount calculator 18 should perform a process taking the frequency control amount into consideration.

When frequency control equivalent to phase control of +90° is carried out through the process of the frequency control amount calculator 18, for example, +90° is added to the angle to acquire a phase difference even for a symbol preceding by one in acquiring a phase difference with respect to this preceding symbol.

In the foregoing description, the frequency control amount is described as a phase error expressed as an angle. Conversion of a phase error expressed by an angle to a frequency unit is done using the relationship of fx (the phase error expressed by an angle/360°) where f is the number of symbols to be transmitted per second (symbol rate) and is expressed by the units of Hz.

When +90° is acquired as the coarse phase error, for example, the frequency control amount becomes −90° which is equivalent to −f/4 [Hz]. When +180° is acquired as the coarse phase error, the frequency control amount becomes −180° which is equivalent to −f/2 [Hz]. And when −180° is acquired as the coarse phase error, the frequency control amount becomes +180° which is equivalent to +f/2 [Hz]. When −90° is acquired as the coarse phase error, the frequency control amount becomes +90° which is equivalent to +f/4 [Hz].

Data on the coarse phase error output from the coarse-phase-error detector 16 is input to the frequency control amount calculator 18.

Data of a symbol in a signal output from the reception filter 19 is input to the symbol-phase-difference detector 15 as shown in FIG. 1. Every time symbol data is input, the symbol-phase-difference detector 15 detects a phase difference between symbols. The data on the intersymbol phase difference detected by the symbol-phase-difference detector 15 is input to the minute-phase-error detector 14.

The minute-phase-error detector 14 detects a phase error based on the input data on the intersymbol phase difference.

Based on the data on the intersymbol phase difference, the minute-phase-error detector 14 detects if the intersymbol phase difference coincides with the specified phase deviation. When the intersymbol phase difference does not coincide with the specified phase deviation, the minute-phase-error detector 14 detects the deviation of the intersymbol phase difference from the specified phase deviation as a minute phase error.

The specified phase deviation between two symbols is (±45°, ±135°) as mentioned above. The minute phase error that is detected by the minute-phase-error detector 14 lies in the range from −45° to +45°.

The data on the minute phase error obtained by the minute-phase-error detector 14 is input to the averaging section 13. Based on the input data on plural minute phase errors, the averaging section 13 performs an averaging process of acquiring an average minute phase error.

Acquisition of the average value of the data on the minute phase errors by the averaging section 13 can reduce the influence of noise. This can permit the phase difference to be acquired accurately. The data on the minute phase error acquired as the average value in the averaging section 13 is output to the frequency control amount calculator 18 therefrom.

The frequency control amount calculator 18 acquires a frequency control amount ($\Delta f$) for controlling the frequency of the input signal based on both the data on the coarse phase error input from the coarse-phase-error detector 16 and the data on the minute phase error input from the averaging section 13.

The frequency control amount ($\Delta f$) acquired by the frequency control amount calculator 18 is output to the frequency-control-amount memory 12. The frequency control amount calculator 18 is equivalent to the frequency control amount acquisition section that acquires the frequency control amount for controlling the frequency of the input signal.

The frequency-control-amount memory 12 stores the input frequency control amount ($\Delta f$), and sends the frequency control amount to the frequency controller 11. The frequency controller 11 performs frequency control on the input signal (baseband signal) from the quadrature demodulator 5 based on the frequency control amount ($\Delta f$).

That is, the frequency controller 11 carries out frequency control by multiplying an IQ signal output from the quadrature demodulator 5

$$a(t) \times \exp(-i2\pi \cdot \Delta f \cdot t + \theta(t))$$

by a signal corresponding to the frequency control amount ($\Delta f$)

$\exp(i2\pi \cdot \Delta f \cdot t)$, thereby yielding $a(t) \times \exp(-i2\pi \cdot \Delta f \cdot t + \theta(t)) \times \exp(i2\pi \cdot \Delta f \cdot t)$ $= a(t) \times \exp(\theta(t))$.

Figure 3:
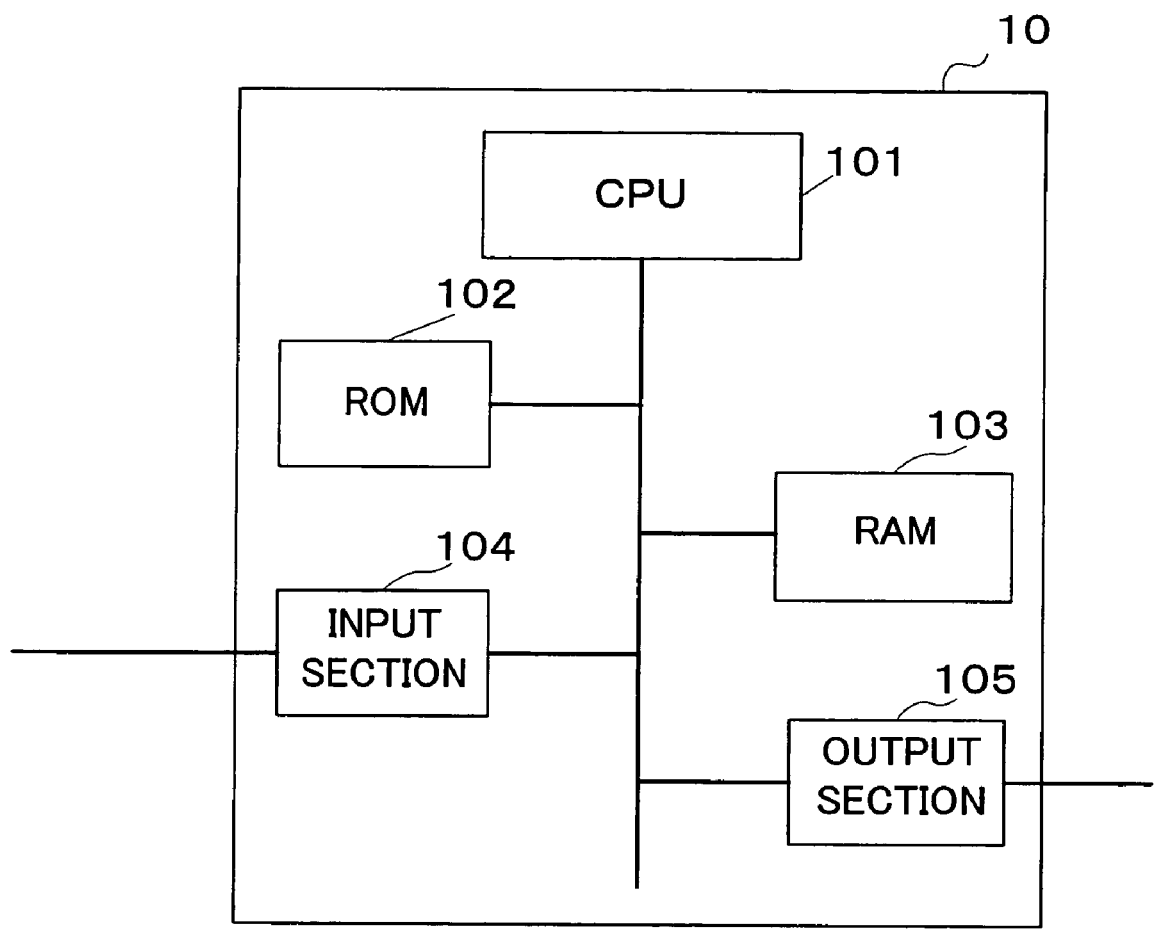
FIG. 3 is a block diagram showing the hardware configuration of a frequency synchronization controller according to the embodiment of the invention.

The frequency synchronization controller 10 discussed above is realized by a microcomputer shown in FIG. 3. The frequency synchronization controller 10 comprises a CPU (Central Processing Unit) 101, a ROM (Read Only Memory) 102, a RAM (Random Access Memory) 103, an input section 104, and an output section 105. Based on data stored in the RAM 103, the averaging section 13, the minute-phase-error detector 14 and the coarse-phase-error detector 16 each perform arithmetic operations based on plural pieces of data.

For instance, the averaging section 13 acquires the average of data on the minute phase errors in the averaging section 13 based on plural pieces of data on minute phase errors detected by the minute-phase-error detector 14 and sequentially stored in an exclusive area for the minute phase errors in the RAM 103. Data on the specified phase deviation (±45°, ±135°) between two symbols is also stored in the RAM 103. Although the embodiment is premised on that the frequency synchronization controller 10 is realized by a microcomputer, the frequency synchronization controller 10 can be realized by a wired logic circuit.

The frequency synchronization controller 10 and the quadrature demodulator 5 can be constructed by a DSP (Digital Signal Processor). When the frequency synchronization controller 10 and the quadrature demodulator 5 are constructed by a DSP, the digital signal output from the A/D converter 3 is processed by the DSP.

The coarse phase error may be detected in the following manner. In case where a signal whose intersymbol phase deviation is known beforehand is input, a coarse phase error is detected when the phase rotation amount exceeds an amount obtained by adding the detection limit (−45°, +45°) of the minute phase error of the minute-phase-error detector 14 to the maximum phase deviation in the known specified phase deviation.

For example, a coarse phase error occurs in case of a signal whose intersymbol phase difference becomes repetition of +45° and −135°, when the phase rotation of over +90° occurs, and when the phase rotation of over −180° occurs.

In such a case, when +135° is detected as the coarse phase rotation amount, the coarse phase error is +90° and the frequency control amount based on that error can be set to −90°. When −225° is detected as the coarse phase rotation amount, the coarse phase error is −90° and the frequency control amount based on that error can be set to +90°.

When a large phase error is detected in detecting a minute phase error in the minute-phase-error detector 14, the frequency control amount based on the previous minute phase errors can be reset. That is, a minute phase error is detected after the signal passes the reception filter (root Nyquist) 19, so that when the phase error is large, there may be no further signals to be detected and detection may not be done accurately. When the level of the signal after passing the reception filter 19 is sufficiently low, detection of a minute phase error may be omitted.

An example of the operation of the wireless communication apparatus 30 will be discussed below. When the user makes an input operation of selecting a specific channel by operating the channel selection key of the wireless communication apparatus 30, the frequency of the channel is set in the tuner 2.

Then, a radio signal of the selected channel is received by the antenna 1. The received signal is output from the tuner 2 through the antenna 1 and the tuner 2. The received signal output from the tuner 2 is converted to an intermediate frequency signal by the signal output from the local oscillator 4.

The received signal converted to the intermediate frequency signal (IF signal) is converted to a digital signal by the A/D converter 3. The digital IF signal converted by the A/D converter 3 is input to the quadrature demodulator 5 where it undergoes quadrature demodulation by the π/4 shift QPSK modulation method. The signal undergone quadrature demodulation in the quadrature demodulator 5 is input to the frequency controller 11.

The frequency of the input signal to the frequency controller 11 is controlled by the frequency controller 11 before the input signal is output therefrom. The frequency controller 11 controls the frequency of the input signal based on the frequency control amount input from the frequency-control-amount memory 12.

The oversampling/phase-rotational-amount detecting section 17 detects the intersymbol phase rotation amount by oversampling the input signal output, from the frequency controller 11, at a rate higher than the symbol rate. Data on the intersymbol phase rotation amount detected by the oversampling/phase-rotational-amount detecting section 17 is input to the coarse-phase-error detector 16. When the coarse-phase-error detector 16 detects a coarse phase error from the input data on the phase rotation amount, the data on the coarse phase error is input to the frequency control amount calculator 18.

The signal that is output from the frequency controller 11 is input the reception filter 19. A phase difference between symbols in the signal output from the reception filter 19 is detected by the symbol-phase-difference detector 15. Data on the intersymbol phase difference detected by the symbol-phase-difference detector 15 is input to the minute-phase-error detector 14.

The minute-phase-error detector 14 detects the deviation of the detected phase difference between two symbols from the specified phase deviation based on the π/4 shift QPSK modulation method. Upon detection of such a deviation, the minute-phase-error detector 14 treats the deviation as a minute phase error.

Data on the minute phase error detected by the minute-phase-error detector 14 is output to the averaging section 13. The averaging section 13 stores the sequentially input data on minute phase errors until the number of pieces of data reaches a predetermined number. Then, the averaging section 13 acquires an average value of the predetermined number of minute phase errors stored, and sends data on the average value of the minute phase errors to the frequency control amount calculator 18.

The frequency control amount calculator 18 acquires a frequency control amount (Δf) for controlling the frequency of the input signal, based on an operation of adding the data on the coarse phase error input from the coarse-phase-error detector 16 to the data of the minute phase error input from the averaging section 13.

The frequency control amount calculator 18 sends the acquired frequency control amount (Δf) to the frequency-control-amount memory 12. The frequency-control-amount memory 12 stores the input frequency control amount (Δf) and sends it to the frequency controller 11.

The frequency controller 11 controls the input signal from the quadrature demodulator 5 based on the frequency control amount (Δf). Accordingly, the signal output from the frequency controller 11 has a frequency error suppressed. The signal whose frequency is controlled by the frequency controller 11 is output to the data demodulator 20.

The signal input to the data demodulator 20 from the frequency controller 11 has a frequency error suppressed by the frequency controller 11. Accordingly, the signal input to the data demodulator 20 is demodulated without deformation.

Even for a large phase rotation, as described above, the wireless communication apparatus 30 detects the phase rotation amount between symbols with large phase rotations by oversampling the input signal. Then, the wireless communication apparatus 30 detects the coarse phase rotation amount of a large intersymbol phase rotation amount, acquires a coarse phase error from the coarse phase rotation amount, and treats the coarse phase error as the frequency control amount for a large phase rotation.

The use of the coarse phase error as the frequency control amount for a large phase rotation can allow the phase rotation to be controlled to have the specified frequency without taking a considerable time. This can ensure fast frequency control to synchronize the frequency of the input signal with the specified frequency even when the phase rotation is large.

Although the foregoing description has been given of the case where the frequency is controlled by the frequency controller 11 provided outside the quadrature demodulator 5, the frequency may be controlled inside the quadrature demodulator 5. In the foregoing description, the modulation method for a received signal is π/4 shift QPSK. The received signal to be controlled in working out the invention is not limited to the one that has been modulated by π/4 shift QPSK, but the invention can be adapted to signals which have been modulated by other modulation methods with the same advantages.

Whatever the modulation method by which a received signal has been modulated, the symbol phase of the input signal demodulated by the corresponding demodulation method is oversampled to acquire an intersymbol phase difference and an intersymbol coarse phase rotation amount is acquired based on the intersymbol phase difference.

A part in the coarse phase rotation amount which exceeds the maximum phase deviation in the specified intersymbol phase deviation is treated as a coarse phase error. This coarse phase error is used as the frequency control amount for controlling a large phase rotation.

INDUSTRIAL APPLICABILITY

According to the invention, a coarse phase error is used as a frequency control amount in controlling the frequency of a received signal. The control based on the coarse phase error does not take much time, so that even when a large phase rotation occurs, fast frequency control can be achieved.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A frequency control apparatus which synchronizes a frequency of a received signal, and comprises:
    an oversampling/phase-rotational-amount detecting section which detects an intersymbol phase rotational amount between symbols of said received signal, modulated by a prescribed modulation method, by oversampling said received signal at a rate higher than a symbol rate;
    a coarse-phase-error detector which detects an amount exceeding a maximum phase deviation in a specified intersymbol phase deviation based on said prescribed modulation method as a coarse phase error when said intersymbol phase rotational amount detected by said oversampling/phase-rotational-amount detecting section exceeds a predetermined amount equal to or greater than said maximum phase deviation;
    a frequency control amount acquisition section which acquires a frequency control amount based on said coarse phase error; and
    a frequency controller which controls said frequency of said received signal according to said frequency control amount.

2. The frequency control apparatus according to claim 1, further comprising:
    a phase difference detector which detects an intersymbol phase difference between symbols in said received signal modulated by said prescribed modulation method; and
    a minute-phase-error detector which detects, as a minute phase error, a difference between said intersymbol phase difference detected by said phase difference detector and said specified intersymbol phase deviation based on said prescribed modulation method, and
    wherein said frequency control amount acquisition section acquires said frequency control amount based on said coarse phase error and said minute phase error.

3. The frequency control apparatus according to claim 2, wherein said predetermined amount is a detection limit of said minute phase error by said minute-phase-error detector added to said maximum phase deviation in said specified intersymbol phase deviation based on said prescribed modulation method.

4. The frequency control apparatus according to claim 2, wherein an average of a plurality of minute phase errors detected by said minute-phase-error detector is input to said frequency control amount acquisition section, which acquires said frequency control amount based on said coarse phase error and said average.

5. The frequency control apparatus according to claim 1, wherein said prescribed modulation method is "π/4"; shift QPSK (Quadrature Phase Shift Keying), said specified intersymbol phase deviation based on said modulation method is (+45°, +135°), and said maximum phase deviation in said specified intersymbol phase deviation is ±135°.

6. A wireless communication apparatus comprising:
    an antenna for receiving a radio signal;
    a tuner for selecting a frequency band of a radio signal to be received;
    a local oscillator which outputs a signal for converting the received signal to an intermediate frequency signal;
    a demodulator which demodulates said intermediate frequency signal; and
    a frequency control apparatus which synchronizes a frequency of a received signal, and comprises
        an oversampling/phase-rotational-amount detecting section which detects an intersymbol phase rotational amount between symbols of said received signal, modulated by a prescribed modulation method, by oversampling said received signal at a rate higher than a symbol rate,
        a coarse-phase-error detector which detects an amount exceeding a maximum phase deviation in a specified intersymbol phase deviation based on said prescribed modulation method as a coarse phase error when said intersymbol phase rotational amount detected by said oversampling/phase-rotational-amount detecting section exceeds a predetermined amount equal to or greater than said maximum phase deviation, a frequency control amount acquisition section which acquires a frequency control amount based on said coarse phase error, and a frequency controller which controls said frequency of said received signal according to said frequency control amount, whereby said frequency of said received signal output from said demodulator is so controlled as to be synchronized with a specified frequency.

7. The wireless communication apparatus according to claim 6, further comprising:

a phase difference detector which detects an intersymbol phase difference between symbols in said received signal modulated by said prescribed modulation method; and a minute-phase-error detector which detects, as a minute phase error, a difference between said intersymbol phase difference detected by said phase difference detector and said specified intersymbol phase deviation based on said prescribed modulation method, and wherein said frequency control amount acquisition section acquires said frequency control amount based on said coarse phase error and said minute phase error.

8. The wireless communication apparatus according to claim 7, wherein said predetermined amount is a detection limit of said minute phase error by said minute-phase-error detector added to said maximum phase deviation in said specified intersymbol phase deviation based on said prescribed modulation method.

9. The wireless communication apparatus according to claim 7, wherein an average of a plurality of minute phase errors detected by said minute-phase-error detector is input to said frequency control amount acquisition section, which acquires said frequency control amount based on said coarse phase error and said average.

10. The wireless communication apparatus according to claim 6, wherein said prescribed modulation method is "π/4"; shift QPSK, said specified intersymbol phase deviation based on said modulation method is (+45°, +135°) and said maximum phase deviation in said specified intersymbol phase deviation is +135°.

11. A frequency control method of synchronizing a frequency of a received signal, comprising:

an oversampling/phase-rotational-amount detecting step of detecting an intersymbol phase rotational amount between symbols of said received signal, modulated by a prescribed modulation method, by oversampling said received signal at a rate higher than a symbol rate;

a coarse-phase-error detecting step of detecting an amount exceeding a maximum phase deviation in a specified intersymbol phase deviation based on said prescribed modulation method as a coarse phase error when said intersymbol phase rotational amount detected by said oversampling/phase-rotational-amount detecting section exceeds a predetermined amount equal to or greater than said maximum phase deviation;

a frequency control amount acquisition step of acquiring a frequency control amount based on said coarse phase error; and a frequency control step of controlling said frequency of said received signal according to said frequency control amount.

12. A computer readable recording medium having recorded a computer program which performs functions of a frequency control apparatus that synchronizes a frequency of a received signal, and instructs a computer to perform functions of:

an oversampling/phase-rotational-amount detecting step which detects an intersymbol phase rotational amount between symbols of said received signal, modulated by a prescribed modulation method, by oversampling said received signal at a rate higher than a symbol rate;

a coarse-phase-error detecting step which detects an amount exceeding a maximum phase deviation in a specified intersymbol phase deviation based on said prescribed modulation method as a coarse phase error when said intersymbol phase rotational amount detected by said oversampling/phase-rotational-amount detecting step exceeds a predetermined amount equal to or greater than said maximum phase deviation;

a frequency control amount acquisition step which acquires a frequency control amount based on said coarse phase error; and a frequency controlling step which controls said frequency of said received signal according to said frequency control amount.

* * * * *